United States Patent [19]
Yamamoto

[11] Patent Number: 5,832,025
[45] Date of Patent: Nov. 3, 1998

[54] RECEIVING APPARATUS AND COMMUNICATIONS APPARATUS

[75] Inventor: Katsuya Yamamoto, Kanagawa, Japan

[73] Assignee: Sony Corporation, Tokyo, Japan

[21] Appl. No.: 634,393

[22] Filed: Apr. 18, 1996

[30] Foreign Application Priority Data

Apr. 21, 1995 [JP] Japan .................................. 7-096630

[51] Int. Cl.⁶ .................................................. H04J 13/02
[52] U.S. Cl. ........................................ 375/200; 375/208
[58] Field of Search .................................. 375/200, 201, 375/204, 208

[56] References Cited

U.S. PATENT DOCUMENTS

| | | | |
|---|---|---|---|
| 5,490,165 | 2/1996 | Blakeney, II et al. ................. | 375/208 |
| 5,548,613 | 8/1996 | Kaku et al. .............................. | 375/208 |
| 5,644,590 | 7/1997 | Sugita ...................................... | 375/208 |
| 5,699,380 | 12/1997 | Sugita ...................................... | 375/208 |

*Primary Examiner*—Melvin Marcelo
*Attorney, Agent, or Firm*—Jay H. Maioli

[57] ABSTRACT

A receiving apparatus for receiving a spread spectrum signal having a plurality of demodulating units for demodulating the spread spectrum signal, a signal combining unit for combining output signals of the demodulating units, a time-out signal generating unit for periodically generating time-out signals, a time-out detection unit for detecting a pilot signal from the received spread spectrum signal by the time-out signals, and an assignment unit for assigning the pilot signal detected by the time-out detection unit to the demodulating unit. A receiver having the receiving apparatus and a transceiver having the above receiving apparatus are also disclosed.

12 Claims, 7 Drawing Sheets

RECEIVING APPARATUS AND COMMUNICATIONS APPARATUS

BACKGROUND OF THE INVENTION

1. Field of the Invention

This invention relates to a receiving apparatus and a communication apparatus in a code division multiple access mobile communication system in which a spread spectrum signal transmitted by each base station is received and demodulated on the basis of a pilot signal of the received spread spectrum signal.

2. Description of the Related Art

In general, if a relay station is used in common by a number of stations for communication, a variety of systems, such as frequency division multiplexing, time division multiplexing or code division multiple access, are used for avoiding interference among communication networks. These systems have merits and demerits and are employed in association with particular objectives of the communication systems.

For example, with the code division multiple access (CDMA) system, the transmitter assigns special codes to different networks and transmits modulated waves of the same carrier frequency after spectrum spreading the modulated waves with this code. The receiver discriminates signals of a desired network by code synchronization. The CDMA system has a feature that, if codes are set between the transmitter and the receiver, communication may be done instantly, and it is superior in privacy and anti-interference properties.

In the mobile communication system employing the CDMA system, a receiving device of a mobile station, referred to hereinafter as a receiver of a mobile station, assigns a timing of a pilot signal transmitted by the base station to a modulator. The modulator demodulates the spread spectrum reception signal from the base station on the basis of a timing of the assigned pilot signal. Since the clocks of a voltage-controlled oscillator used at the receiver of the mobile station are generally not in complete coincidence with those of a voltage-controlled oscillator used at the base station, the demodulator performs processing for detecting frequency errors between the mobile station and the base station and correcting the detected errors.

The mobile communication system, employing the CDMA system, has already been standardized in the USA. The system standard for the receiver of the mobile station (IS-95 and IS-98) provides for demodulation performance, such as a message error rate (MER) and a bit error rate (BER) as the result of modulation by the receiver of the mobile station, without providing method for assigning pilot signals for the demodulator as described above.

For improving the demodulation performance, it is necessary to detect pilot signals transmitted by the base station and to assign a pass with strong energy among utilizable signal components of the detected pilot signal. The utilizable signal components are referred to hereinafter as multi-pass components.

However, the receiver of the mobile station has to perform processing for the communication protocol and speech encoding/decoding in addition to the above-mentioned processing for pilot signal assignment. Thus it has not been possible to perform processing for the communication protocol and speech encoding/decoding with the same performance as that for detection of the pilot signals.

In connection with pilot signal detection, the above-described system standards provide a search window width for detecting the pilot signal.

However, if a periodic time-out is to be generated in detecting a pilot signal for time-divisional detection, the timing of the pilot signal recognized from previous detection becomes different from the timing of the actual pilot signal, each time a pilot signal is detected, such that the pilot signal becomes unable to be detected within the search window.

On the other hand, if unlock in a pilot signal is detected in demodulators of the receiver of the mobile station, it is necessary to detect the pilot signal at once and to assign a utilizable pilot signal to the demodulator for which unlock has been detected for thereby improving demodulation performance such as MER or BER.

The processing subsequent to unlock is basically the same as the processing for assigning a pilot signal after time-out has occurred. For assigning a pilot signal immediately after unlock for improving the demodulation performance, it has been necessary to provide for separate processing to be performed subsequent to unlock. This, however, leads to redundant and complicated processing for pilot signal assignment.

SUMMARY OF THE INVENTION

It is therefore an object of the present invention to provide a receiver for a mobile station of high communication quality having a stable performance and high-quality results of modulation at all times.

It is another object of the present invention to provide a receiver for a mobile station of high communication quality capable of correctly detecting the pilot signal.

It is yet another object of the present invention to provide a receiver for a mobile station of high communication quality having an improved demodulation performance without complicating the processing for pilot signal assignment to demodulators.

In the receiving apparatus and the communication apparatus according to the present invention, the time-out generating means generates periodic time-outs every pre-set time interval. The detection unit detects, from the spread spectrum signals received by a code division multiple access system from an optional one of plural base stations, a pilot signal each time the time-out of the time-out generating unit is generated. The assignment unit assigns the pilot signals detected by the detection unit to plural demodulation units in the order of the decreasing energy intensities of the multi-pulse components of the pilot signals. The demodulation units demodulate the spread-spectrum signals from the optional base station based upon the pilot signals from the assignment unit. The synthesizing unit synthesizes the spread spectrum signals demodulated by the demodulation units. Since the multi-pass components may be continuously demodulated in this manner in the order of the decreasing energy intensities at all times, the performance on detection of the pilot signals may perpetually be maintained for assuring high-quality results of demodulation and improved communication quality.

In the receiving apparatus and the communication apparatus according to the present invention, the timing generating unit generates timing signals within the apparatus, and corrects the timing of generating the timing signals based upon the control signal from the error synthesizing means. The error detection units of the demodulation means detect the frequency error between the previous pilot signal and the current pilot signal from the assignment means based upon the timing signals from the timing generating means. The error synthesis means synthesize frequency errors detected by the error detection means for generating a control signal.

The demodulating means correct the frequency errors between the previous pilot signal and the current pilot signal from the assignment means on the basis of the control signal from the error synthesis means for demodulation. Since the detection means detect the pilot signals in the detection range of detecting the pilot signal corrected responsive to the frequency error, the pilot signals can be corrected accurately, thus improving the communication quality.

In the receiving apparatus and the communication apparatus according to the present invention, the lock detection means of the demodulation means detect unlock of the pilot signals from the assignment means. The time-out generating means generates timings at a period corresponding to the detection signals from the lock detection means. If unlock is detected, the pilot signal that can be used can be assigned at once to the unlocked demodulator. The processing following unlock and the processing of assigning the pilot signals following timeout occurrence may be combined into a common processing operation, thus facilitating pilot signal assignment to the demodulators and assuring improved demodulation performance and communication quality.

In addition, with the communication apparatus of the present invention, since a smaller power consumption suffices for achieving the same reception quality due to improved demodulation performance of the receiving system, a communication apparatus may be provided which is small-sized, lightweight, low in power consumption and capable of operating for prolonged time.

DESCRIPTION OF THE PREFERRED EMBODIMENTS

Figure 1:
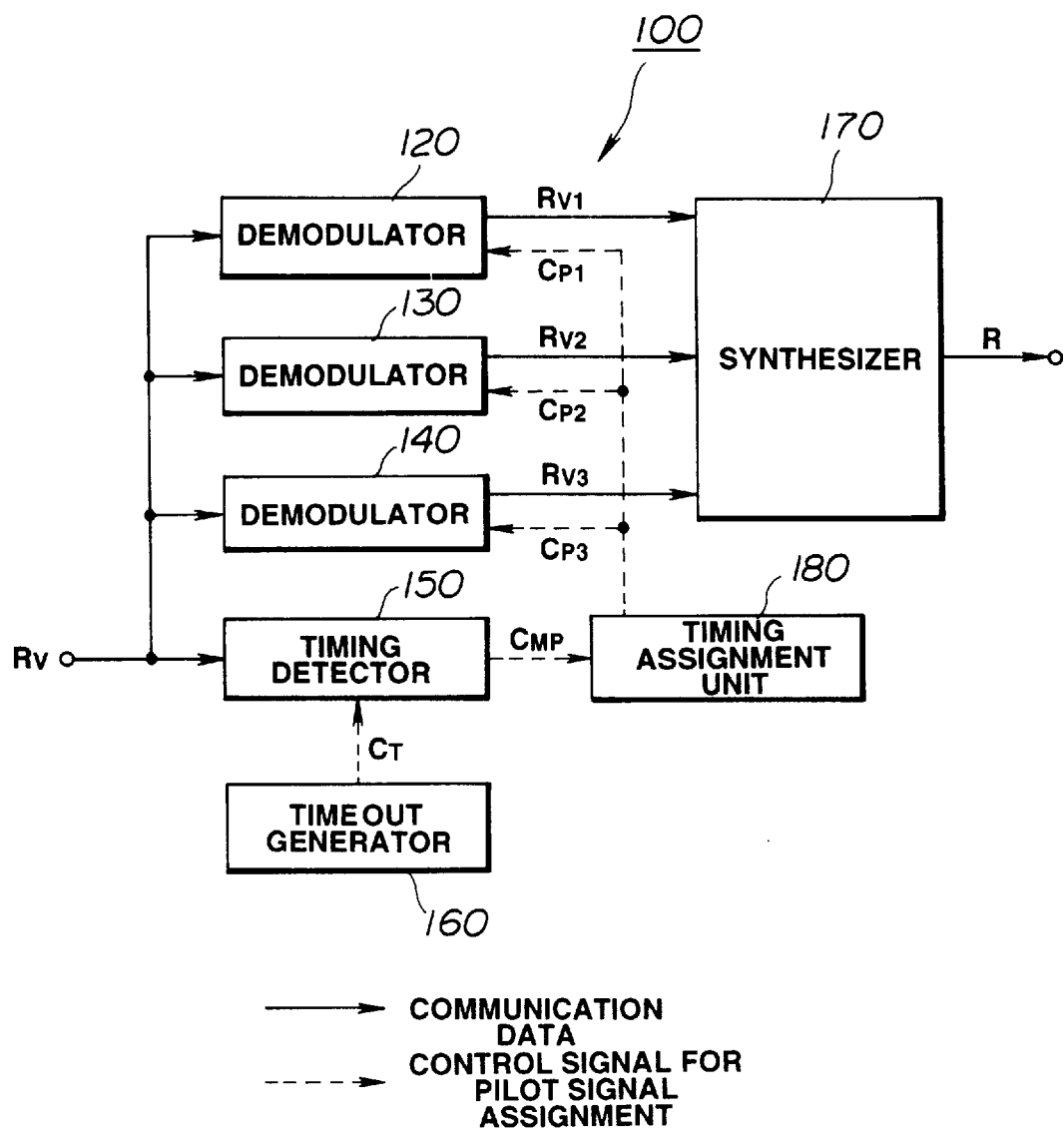
FIG. 1 is a block diagram showing an arrangement of a receiver of a mobile station according to a first embodiment of the present invention.

Referring to the drawings, certain preferred embodiments of the present invention will be explained in detail.

First, a receiver of the mobile station according to a first embodiment is explained.

The receiver of the mobile station is a receiver of a mobile station 100 in the CDMA system mobile communication system, adapted to receive a spread spectrum signal transmitted by plural base stations and to demodulate and output received signals, as shown in FIG. 1.

That is, the receiver of the mobile station 100, employing a rake reception system, includes three demodulators 120, 130, 140 and a timing detector 150, fed with reception data Rv, a timing assignment unit 180, fed with an output of the timing detector 150, and a synthesizer 170 fed with outputs of the demodulators 120, 130 and 140.

The receiver of the mobile station 100 also includes a time-out generator 160, an output of which is supplied to the timing detector 150. An output of the timing assignment 180 is supplied to each of the demodulators 120, 130 and 140.

The receiver of the mobile station 100 also includes a receiving unit having an antenna, not shown. By this antenna of the receiving unit, the spread spectrum reception signals, transmitted by an optional one of the plural base stations, are received. The reception signals, received by the antenna of the receiving unit, are A/D converted after demodulation to base band signals.

The reception signals, thus processed, are supplied as reception data Rv to the three demodulators 120, 130 and 140 and to the timing detector 150.

The timeout generator 160 is constructed by hardware by utilizing a timer function enclosed in a micro-processor, not shown, within the receiver of the mobile station 100, and generates a periodic time-out signal $C_T$ every pre-set time interval. As the period of generation of this time-out signal $C_T$, an arbitrary value is set, which is not less than the sum of the time necessary for demodulating a multi-pass component of the plot signal once by each of the demodulators 120, 130 and 140 (that is, the time necessary for searching for a pilot signal in the reception signal once), and the time necessary for assigning the timing once to each of the demodulators 120, 130 and 140.

Thus the time-out generator 160 generates and outputs the time-out signal $C_T$ periodically at a pre-set time interval to the timing generator 150.

If the time-out signal $C_T$ is not generated from the time-out generator 160, a signal processing unit, not shown, in the mobile reception device 100 performs processing for communication protocol or processing for speech encoding/decoding.

Figure 2:
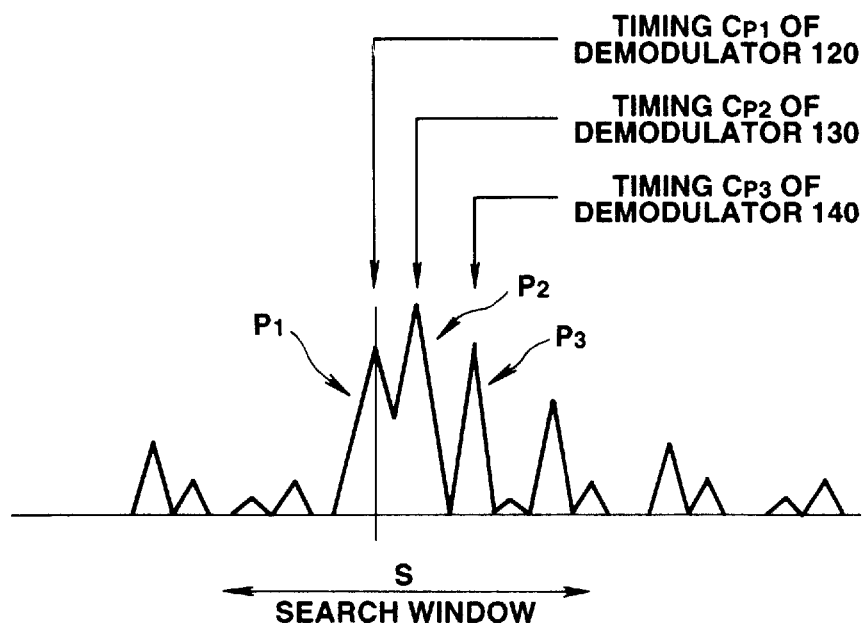
FIG. 2 illustrates multi-pass components detected in a search window.

If the time-out signal $C_T$ is generated by the time-out generator 160, the timing detector 150 channel-separates the pilot signal from the reception data Rv received by the receiving unit, and searches the range to be searched under the system standards (IS-95, IS-98) by the receiver of the mobile station 100, that is a search window S, as shown in FIG. 2, for detecting the multi-pass components $C_{MP}$ of the pilot signal. The timing detector 150 supplies the detected multi-pass components $C_{MP}$ to the timing assignment unit 180.

The timing assignment unit 180 selects the timings of three multi-pass components from the multi-pass components $C_{MP}$ from the timing detector 150 in the order of the decreasing energy intensities.

That is, since three demodulators, namely the demodulators 120, 130 and 140, are employed in the instant embodiment, the three multi-pass components $P_1$, $P_2$ and $P_3$ are selected in the order of the decreasing energy intensities, as shown in FIG. 2. The timing assignment unit 180 assigns timings of the selected three multi-pass components $P_1$, $P_2$ and $P_3$ as timing control signals $C_{P1}$, $C_{P2}$ and $C_{P3}$ to the demodulators 120, 130 and 140, respectively.

The demodulator 120 inversely spectrum-spreads the reception data Rv received at the reception unit, based upon the timing control signal $C_{P1}$ from the timing assignment unit 180, for channel separation and demodulation. Similarly, the demodulators 130 and 140 inversely spectrum-spread the reception data Rv received at the reception unit, based upon the timing control signals $C_{P2}$ and $C_{P3}$ from the timing assignment unit 180, respectively, for channel separation and demodulation. The demodulators 120, 130 and 140 transmit demodulated reception data Rv as reception data $R_{v1}$, $R_{v2}$ and $R_{v3}$ to the synthesizer 170.

The synthesizer 170 synthesizes the reception data $R_{v1}$, $R_{v2}$ and $R_{v3}$ from the demodulators 120, 130 and 140 to generate and output reception data R.

The above-described demodulation operation is carried out each time the time-out signal $C_T$ is generated from the time-out generator 160.

In general, the multi-pass components demodulated by the demodulator are varied significantly by external environments, such as movements of receiver of the mobile station or fading, such that the multi-pass components vanish and are again generated repeatedly. In the instant embodiment, since the timings of the multi-pass components of the pilot signal searched every periodic time-out are assigned to the demodulators 120, 130 and 140 in the order of decreasing energy strengths, the three demodulators 120, 130 and 140 continue to demodulate the three multi-pass components in the order of decreasing energy strength for assuring the stable high-quality results of demodulation at all times. Thus the reception data R, produced by the synthesizer 170, is perpetually stable and of high quality.

That is, the processing for communication protocol and speech encoding/decoding can be performed at all times while the performance comparable to that when the pilot signal is searched is maintained, thus assuring improved communication quality of the receiver of the mobile station 100.

The receiver of the mobile station according to the second embodiment of the present invention is explained.

Figure 3:
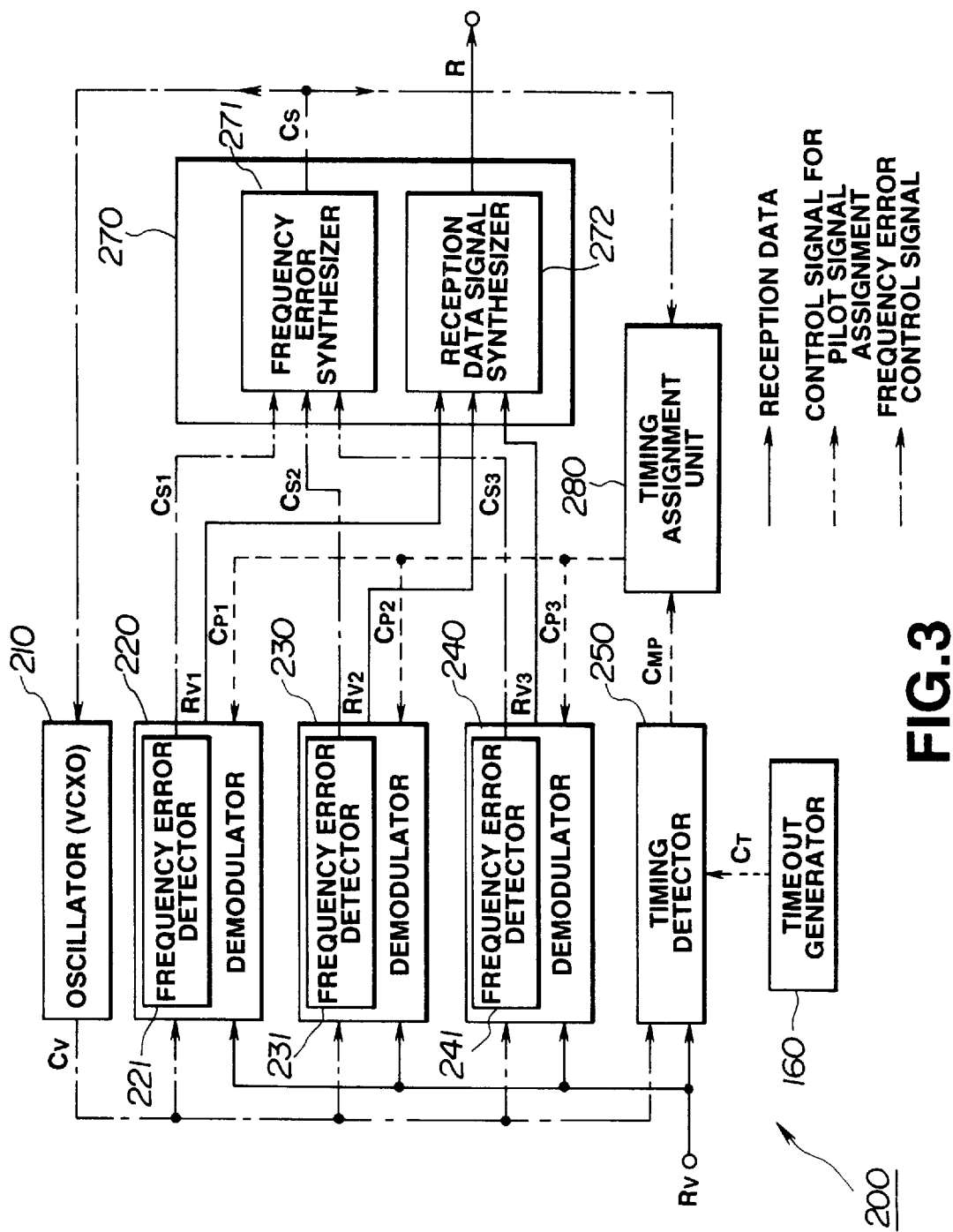
FIG. 3 is a block diagram showing an arrangement of a receiver of a mobile station according to a second embodiment of the present invention.

The receiver of the mobile station is a receiver of the mobile station 200 configured as shown in FIG. 3.

That is, the receiver of the mobile station 200, similar in structure to the receiver of the mobile station 100, is however provided with a voltage controlled crystal oscillator (VCXO) 210 for generating the internal timing of the receiver of the mobile station 200.

In the instant embodiment, three demodulators 220, 230 and 240, corresponding to the demodulators 130, 140 and 150, respectively, are provided with frequency error detectors 221, 231 and 241, respectively.

In addition, a synthesizer 270, corresponding to the synthesizer 170, has a frequency error synthesizer 271 and a reception data synthesizer 272. The demodulators 220, 230 and 240 output reception data $R_{v1}$, $R_{v2}$ and $R_{v3}$ which are supplied to the reception data synthesizer 272. Outputs of the frequency error detectors 221, 231 and 241 are supplied to the frequency error synthesizer 271, while an output of the frequency error synthesizer 271 is supplied to a timing assignment unit 280 corresponding to the timing assignment unit 180.

An output of the VCXO 210 is supplied to each of the demodulators 220, 230 and 240 and to a timing detector 250 corresponding to the timing detector 150 shown in FIG. 1.

The portions performing the same operation as that of the receiver of the mobile station 100 are denoted by the same numerals and the corresponding description is not made for simplicity.

Figure 4:
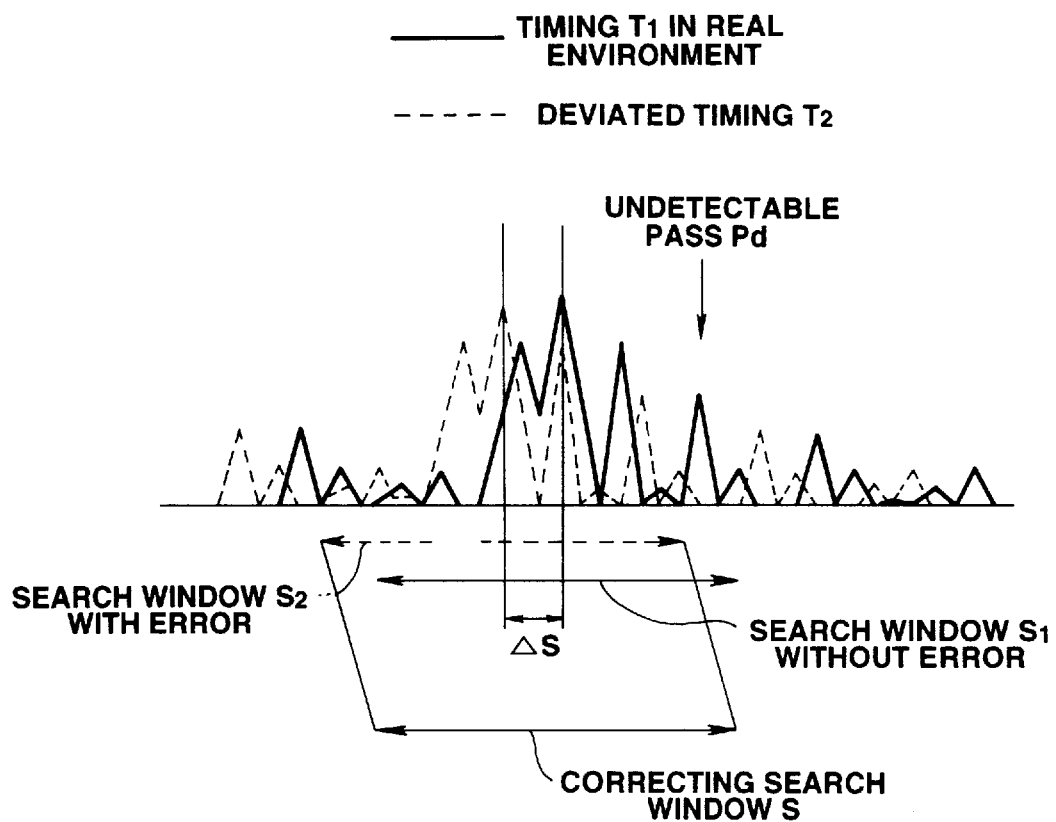
FIG. 4 illustrates timing deviation caused by occurrence of frequency errors.

If now the periodic clocks $C_T$ are generated by the time-out generator 160, in the same way as in the above-described first embodiment, for time-divisionally searching the pilot signal, the clocks of the VCXO 210 of the receiver of the mobile station 200 are not in perfect coincidence with the clocks of a VCXO of a base station, not shown. Thus there is produced a deviation between a timing $T_2$ of the pilot signal recognized by the timing detector 250 by the previous pilot signal search and a timing $T_1$ of the currently searched pilot signal, as shown in FIG. 4. That is, a deviation $\Delta S$ is produced between a search window $S_2$ of the previous search and a search window $S_1$ of the current search such that a signal $P_d$ which should intrinsically be detected cannot be detected.

Thus, in the instant embodiment, this deviation $\Delta S$ between the previous search window and the current search window is corrected. This is explained in detail by referring to the flowchart of FIG. 5.

The time-out generator 160 generates, at step S41, a periodic time-out signal $C_T$ for the timing detector 250 every pre-set time interval.

Simultaneously, the VCXO 210 generates clocks for the demodulators 220, 230 and 240 and for timing detector 250 at an internal timing of the receiver of the mobile station 200 derived from the control signal Cs from the frequency error synthesizer 271, as later explained.

On occurrence of the time-out signal $C_T$ from the time-out generator 160, a pilot signal assignment control operation is performed (step S46). The pilot signal assignment control operation (step S46) will be explained in detail subsequently.

If the time-out signal $C_T$ is not produced by the time-out generator 160, the processing contents are judged at the receiver of the mobile station 200 in accordance with the priority sequence (step 42). Control then transfers to processing for communication protocol (step 43), speech encoding and decoding (step 44) or to other processing (step 45).

The processing of pilot signal assignment (step S46) is explained.

The timing detector 250 searches the pilot signal from the reception data Rv, at all timings, at an initial stage such as on power up, and acquires a correct timing of the pilot signal of the reception data Rv. The timing detector then decides the search range by the receiver of the mobile station 200 as specified by the system standards (IS-95, IS-98). That is, the timing generator decides the range to be searched based upon the number of chips.

The timing detector 250 corrects the range to be actually searched, based upon the clock Cv from the VCXO 210 (step 462). The timing detector 250 then channel-separates the pilot signal from the reception data Rv obtained by the receiving unit and searches (step 463) to detect multi-pass components $C_{MP}$ of the pilot signal. The timing detector 250 transmits the detected multi-pass component $C_{MP}$ to the timing assignment unit 280.

The timing assignment unit 280 records, on the basis of the control signal Cs from the frequency error synthesizer 271 as later explained, a candidate for the timing having the strong energy from the multi-pass component $C_{MP}$ from the timing detector 250 (step 464).

The timing assignment unit 280 selects, from the recorded timing candidates, the three multi-pass components in the order of decreasing energy strength (step 465), and assigns the timings of the selected three multi-pass components to the demodulators 220, 230 and 240 as timing control signals $C_{P1}$, $C_{P2}$ and $C_{P3}$, respectively (step 466).

The frequency error detector 221 of the demodulator 220 detects an error between the clock Cv from the VCXO 210 by the previous search and that by the current search, that is the frequency error $C_{s1}$ within the demodulator 220, and transmits the frequency error $C_{S1}$ to the frequency error synthesizer 271. Similarly to the frequency error detector 221, the frequency error detector 231 within the demodulator 230 and the frequency error detector 241 within the demodulator 240 detect the frequency error $C_{S2}$ within the demodulator 230 and the frequency error $C_{S3}$ within the demodulator 240, respectively, and transmit the frequency errors $C_{S2}$ and $C_{S3}$ to the frequency error synthesizer 271.

The frequency error synthesizer 271 synthesizes the frequency error $C_{S1}$, frequency error $C_{S2}$ and the frequency error $C_{S3}$ from the frequency detectors 221, 231 and 241, respectively, and transmits the synthesized frequency error $C_S$, that is the frequency error $C_S$ in the receiver of the mobile station 200, as the control signal $C_S$, to the timing assignment unit 280 and to the VCXO 210.

The VCXO 210 corrects the timing within the receiver of the mobile station 200, based upon the control signal $C_S$ from the frequency synthesizer 271, and generates output clocks $C_V$ at the corrected timing to the demodulators 220, 230, 240 and to the timing detector 250.

Thus, in the processing at step 462, the timing detector 250 corrects the search range on the basis of the clock Cv generated at the corrected timing from the VCXO 210. That is, the timing detector 250 corrects the deviation ΔS between the timing $T_2$ of the pilot signal recognized by the search of the previous search and the timing $T_1$ of the currently searched pilot signal, and searches the pilot signal within the corrected search window S, as shown in FIG. 4.

On the other hand, the timing assignment unit 280 corrects the timing of the multi-pass components $C_{MP}$ from the timing detector 250 on the basis of the control signal $C_S$ from the frequency error synthesizer 271. Thus the timing assignment unit 280 outputs to the demodulators 220, 230 or 240 the timing control signal $C_P$ of the corrected timing, that is of the timing corrected for frequency error between the clocks Cv in the receiver of the mobile station 200 and the clocks in the base station, not shown.

The demodulators 220, 230 and 240 receive the timing control signal $C_P$ from the timing assignment unit 280 as $C_{P1}$, $C_{P2}$ and $C_{P3}$, respectively. The demodulators 220, 230 and 240 then inversely spectrum-spread the reception data Rv obtained by the receiving unit and demodulate the data after channel separation. The demodulators 220, 230 and 240 transmit the demodulated reception data Rv as reception data $R_{v1}$, $R_{v2}$ and $R_{v3}$, respectively, to the reception data synthesizer 272.

The reception data synthesizer 272 synthesizes the reception data $R_{v1}$, $R_{v2}$ and $R_{v3}$ from the demodulators 220, 230 and 240, respectively, to form reception data R, which is outputted.

Thus the pilot signal may be searched for in the vicinity of the correct timing every pre-set period, as described above.

With the present second embodiment, the frequency error $C_S$ between the clocks in the receiver of the mobile station 200 and the clocks within the base station is corrected and the deviation between the timing of the pilot signal recognized by search of the previous search and the timing of the currently searched pilot signal is corrected responsive to the frequency error $C_S$ to search the pilot signal in the corrected search window, so that an undetectable pass Pd, as shown in FIG. 4, may be prohibited from being produced.

Thus the pilot signal may be searched correctly, such that the reception data R, demodulated on the basis of the correctly searched pilot signal, is improved in stability and signal quality.

The receiver of the mobile station according to the third embodiment of the present invention is explained.

Figure 6:
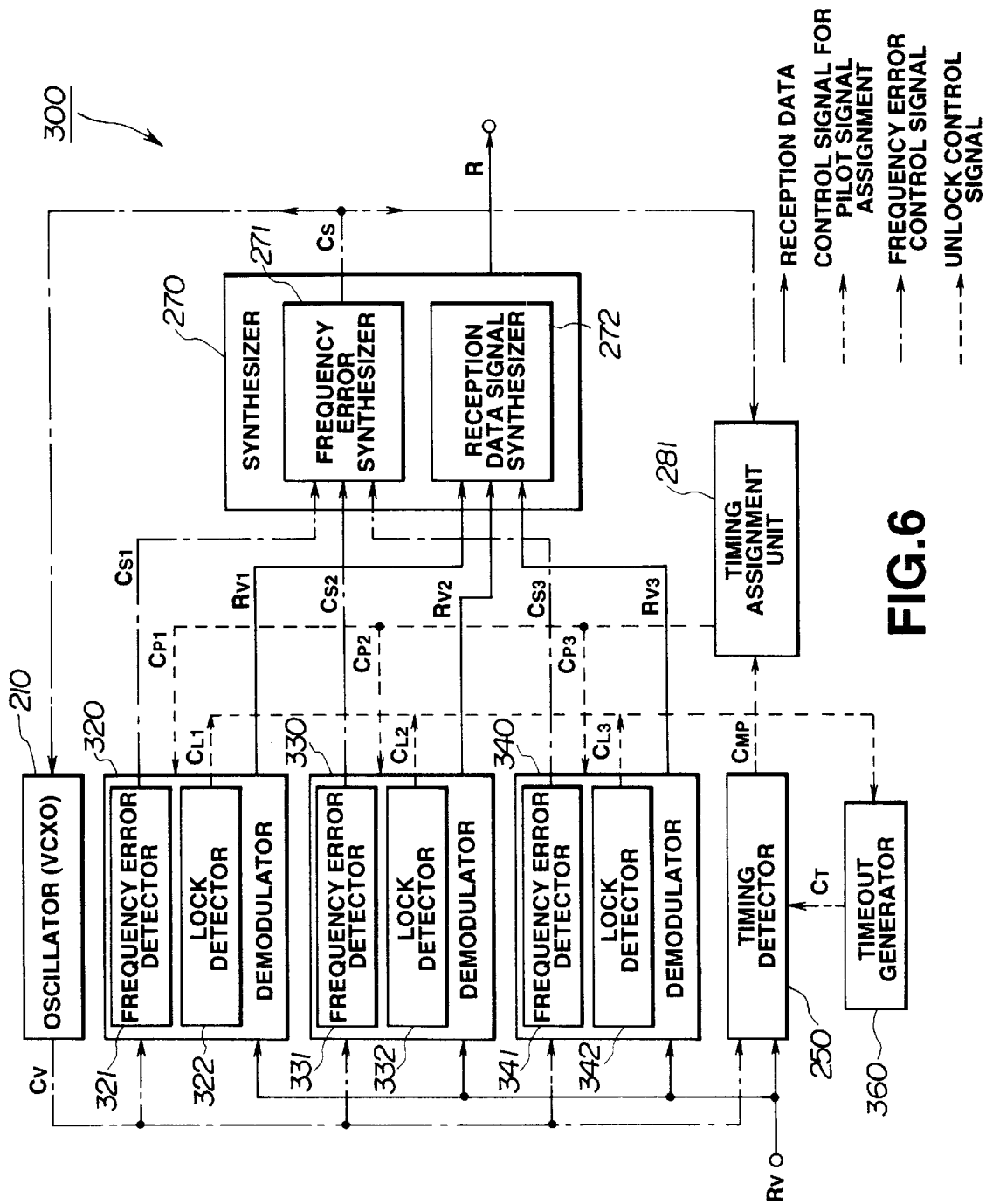
FIG. 6 is a block diagram showing an arrangement of a receiver of a mobile station according to a third embodiment of the present invention.

The receiver of the mobile station of the third embodiment is a receiver of the mobile station 300 configured as shown in FIG. 6.

That is, the receiver of the mobile station 300, similar in structure to the receiver of the mobile station 100, however, has demodulators 320, 330 and 340 equivalent to the demodulators 220, 230 and 240, respectively, shown in FIG. 3. A frequency error detector 321 and a lock detector 322 are provided in the demodulator 320, while a frequency error detector 331 and a lock detector 332 are provided in the demodulator 330 and a frequency error detector 341 and a lock detector 342 are provided in the demodulator 340.

Outputs of the lock detectors 322, 332 and 342 are supplied to a time-out generator 360 corresponding to the time-out generator 160 shown in FIGS. 1 and 3.

The multi-pass components demodulated by the demodulators 320, 330 and 340 are varied significantly by external environments, such as movements of the receiver of the mobile station 300 or fading, such that the multi-pass components vanish and are again generated repeatedly. Thus the demodulators 320, 330 and 340 may be unable to lock onto pilot signal at all times.

Thus, with the present embodiment, the period of occurrence of the time-out signal $C_T$ generated by the time-out generator 360 may be varied. That is, if the pilot signal unlock is detected in the demodulators 320, 330 and 340, the period of occurrence of the time-out signal $C_T$ is changed for immediately producing the time-out signal $C_T$.

Specifically, the lock detector 322 of the demodulator 320 detects pilot signal unlock and transmits an unlock detection signal $C_{L1}$ to the time-out generator 360. Similar to the lock detector 322, the lock detector 332 of the demodulator 330 and the lock detector 342 of the demodulator 340 detect unlock and transmit unlock detection signals $C_{L2}$, $C_{L3}$ to the time-out generator 360.

If unlock is detected, the time-out generator 360 is responsive to the detection signals $C_{L1}$, $C_{L2}$ and $C_{L3}$ to change the designated time for the time-out signal $C_T$ and generates the time-out signal $C_T$ immediately.

Figure 5:
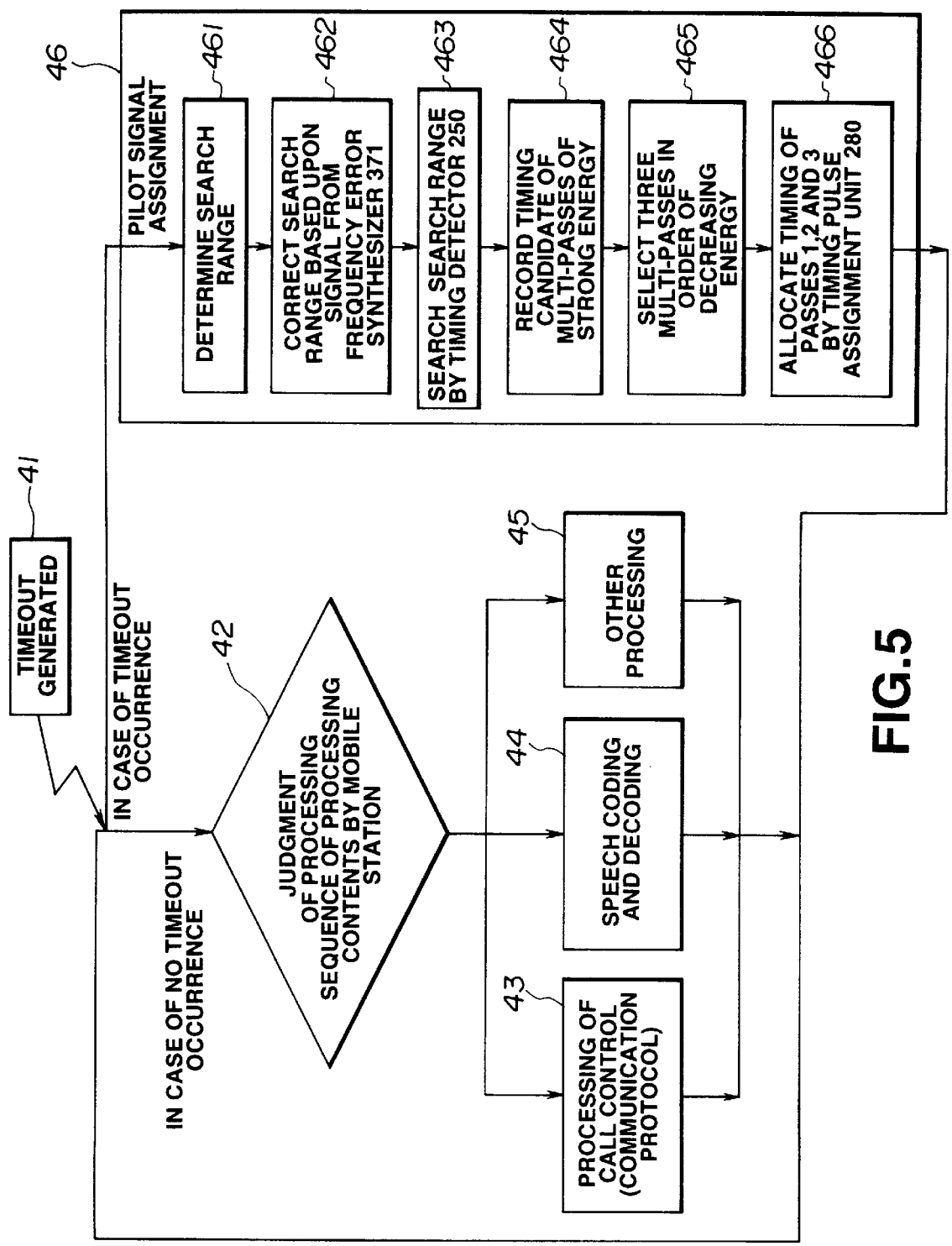
FIG. 5 is a flowchart for illustrating pilot signal allocation in the receiver of the mobile station.

Thus, on occurrence of the time-out signal $C_T$ from the time-out generator 360, pilot signal assignment of step S46 shown in FIG. 5 is carried out, so that the demodulators 320, 330 and 340 demodulate three passes in the order of decreasing energy strength.

With the present embodiment, if the pilot signal unlock is detected by the demodulators 320, 330 and 340, the period of occurrence of the time-out signal $C_T$ is modified and the time-out signal $C_T$ is generated immediately. A pilot component that may be used immediately is assigned to the demodulator in which unlock has occurred, thereby improving the demodulation performance. The processing after unlock and the pilot signal assignment after occurrence of time-out may be combined into a common processing. Thus the pilot signal assignment operation may be facilitated and the reception data R obtained on demodulation may be stable and of high signal quality.

The above-described embodiments can be applied to a radio receiver and a radio transmitter.

Figure 7:
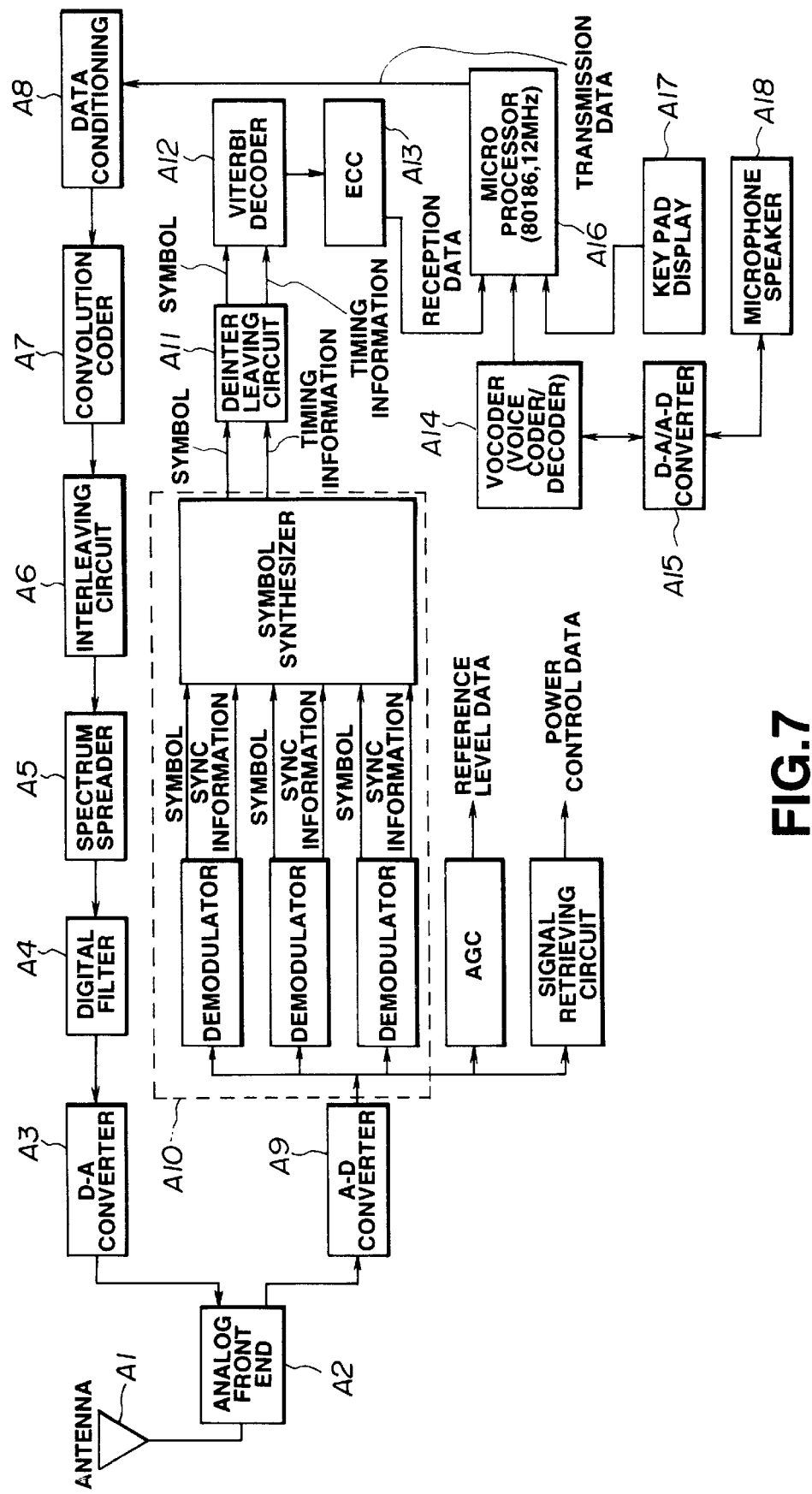
FIG. 7 is a block diagram of a radio communication apparatus to which the first to third embodiments may be applied.

In FIG. 7, showing an arrangement of a radio transmitter, A1 is an antenna for transmitting/receiving electrical waves, and A2 is a front end containing a transmission/reception switching circuit.

Referring to the transmitting system, A8 is a circuit for pre-processing for transmission of transmission data, and A7 is a coder for generating a convolutional code. A6 is an interleaving circuit for interchanging the codes for improving strength against burst errors. A5 is a spectrum spreader for spreading the signals by PN codes. A4 is a digital filter for eliminating unneeded bands, and A3 is a D/A converter for conversion to analog signals.

Referring to the reception system, A9 is an A/D converter for converting received analog signals to digital signals. A10 is a circuit explained in the first to third embodiments. A11 is a circuit for deinterleaving demodulated signals. A12 is a viterbi decoder for decoding the convolutional codes. A13 is an error correction circuit for correcting errors based upon the transmitted signal.

A16 is a micro-processor for controlling the processing of transmitted and received data and the operation of the transmitter, and A17 is a key-pad/display for controlling the transmitter and for displaying the status of the transmitter.

A16 is a vocoder for coding/decoding speech. A15 is a A/D-D/A converter for A/D and D/A conversion of speech signals and A18 is a microphone/speaker for speech input/output.

What is claimed is:

1. A receiving apparatus for receiving a spread spectrum signal comprising:
   a plurality of demodulating means for demodulating the spread spectrum signal;
   signal combining means for combining output signals of said demodulating means;
   time-out signal generating means for periodically generating time-out signals;
   time-out detection means for detecting a pilot signal from the received spread spectrum signal using said time-out signals; and
   assignment means for assigning the pilot signal detected by said time-out detection means to said demodulating means.

2. The receiving apparatus for receiving a spread spectrum signal as claimed in claim 1 wherein said assignment means assigns said pilot signal to said demodulating means in an order of decreasing strength of said pilot signal.

3. The receiving apparatus for receiving a spread spectrum signal as claimed in claim 1 wherein said plurality of demodulating means include frequency error detection means for detecting a frequency error between the pilot signal and a previous pilot signal, said signal combining means including frequency error combining means for combining output signals of said frequency error detection means for generating a combined error signal, said assignment means adjusting the pilot signal based upon the combined error signal and further comprising previous signal generating means for generating the previous pilot signal based upon the combined error signal.

4. The receiving apparatus for receiving a spread spectrum signal as claimed in claim 3 wherein said plurality of demodulating means include lock detection means for detecting a lock operation to the pilot signal, said time-out signal generating means generating the time-out signal periodically based upon output signals generated by said lock detection means.

5. A receiving method for receiving a spread spectrum signal comprising the steps of:
   detecting generation of a time-out signal;
   assigning a pilot signal to a plurality of demodulating means if said time-out signal is generated; and
   performing another operation if said time-out signal is not generated.

6. The receiving method for receiving a spread spectrum signal as claimed in claim 5 wherein:
   said assigning step comprises sub-steps of:
      determining a range of frequency search;
      adjusting said range of frequency search;
      searching said range of frequency search;
      finding a strong signal; and
      assigning a timing to the plurality of demodulation means.

7. A receiver for receiving a spread spectrum signal, said receiver comprising an antenna, radio frequency signal processing means, spread spectrum signal processing means, base band signal processing means, audio signal processing means, and electro-acoustic signal conversion means, said spread spectrum signal processing means comprising:
   a plurality of demodulating means for demodulating the spread spectrum signal;
   time-out signal generating means for periodically generating a time-out signal;
   time-out detecting means for detecting a pilot signal from the received spread spectrum signal using said time-out signal;
   assignment means for assigning the pilot signal detected by said time-out detecting means to said demodulating means; and
   signal combining means for combining output signals of said plurality of demodulating means and producing a received signal output.

8. The receiver for receiving a spread spectrum signal as claimed in claim 7 wherein said plurality of demodulating means include frequency error detection means for detecting a frequency error between the pilot signal and a previous pilot signal, said signal combining means include frequency error signal combining means for combining output signals of said frequency error detection means for generating a combined error signal, and said assignment means adjusts assignment of the pilot signal based upon the combined error signal, and further comprising previous pilot signal generating means for generating the previous pilot signal based upon the combined error signal.

9. The receiver for receiving a spread spectrum signal as claimed in claim 8 wherein said plurality of demodulating means include lock detection means for detecting a lock operation to the pilot signal, and wherein said time-out signal generating means periodically generates time-out signals based upon output signals generated by said lock detection means.

10. A transceiver for receiving and transmitting a spread spectrum signal, said transceiver comprising an antenna, radio frequency signal processing means, spread spectrum signal processing means, base band digital signal processing means, audio frequency signal processing means, electro-acoustic signal conversion means, digital coding means and spread spectrum modulation means, said spread spectrum modulation means comprising:
   a plurality of demodulating means for demodulating the spread spectrum signal;
   signal combining means for combining output signals of said demodulating means;
   time-out signal generating means for periodically generating time-out signals;
   time-out detection means for detecting a pilot signal from the received spread spectrum signal by the time-out signal; and assignment means for assigning the pilot signal detected by said time-out detection means to said demodulating means.

11. The transceiver for receiving and transmitting a spread spectrum signal as claimed in claim 10 wherein said plurality of demodulating means include frequency error detection means for detecting a frequency error between the pilot signal and a previous pilot signal, said signal combining means includes frequency error combining means for combining output signals of said frequency error detection means for generating a combined error signal, said assignment means adjusting the pilot signal based upon the combined error signal and further comprising previous pilot signal generating means for generating said previous pilot signal based upon the combined error signal.

12. The transceiver for receiving and transmitting a spread spectrum signal as claimed in claim 11 wherein said demodulating means includes lock detection means for detecting a lock operation to the pilot signal, said time-out signal generating means periodically generating the time-out signal based upon output signals generated by said lock detection means.

* * * * *